H. L. PALMER.
Assignor by mesne assignments to BENJ. C. FAUROT, Trustee.
APPARATUS FOR LINING PAPER-BOARD.
No. 7,517. Reissued Feb. 20, 1877.
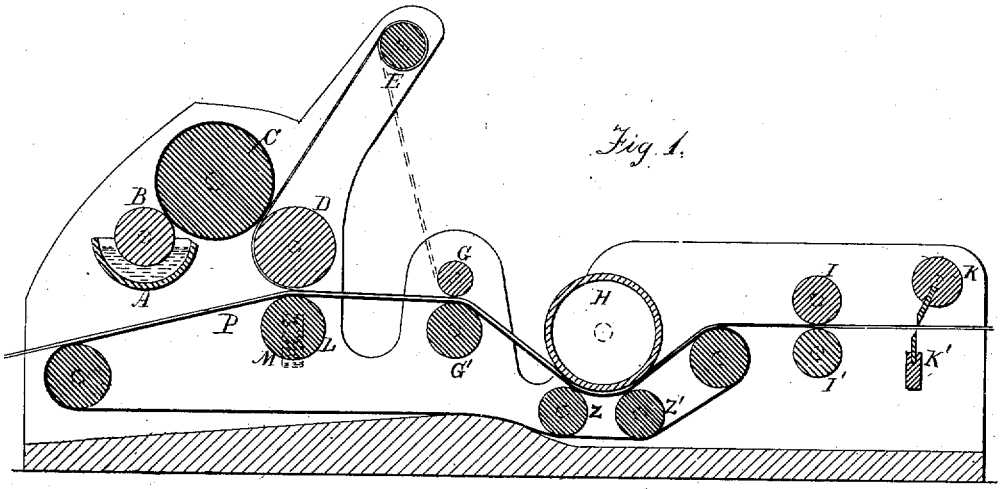
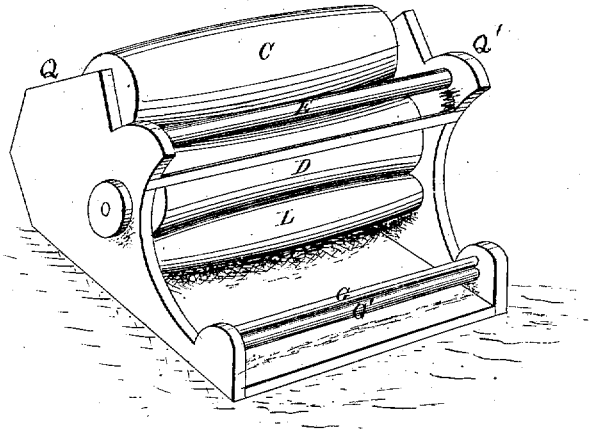
Witnesses:
Grenville Lewis
H. W. Kenny
Inventor.
Henry L. Palmer
By Hill & Ellsworth
His Attys.
THE NORRIS PETERS CO., WASHINGTON, D. C.

UNITED STATES PATENT OFFICE.

HENRY L. PALMER, OF BROOKLYN, NEW YORK, ASSIGNOR, BY MESNE ASSIGNMENTS, TO BENJAMIN C. FAUROT, TRUSTEE.

IMPROVEMENT IN APPARATUS FOR LINING PAPER BOARD.

Specification forming part of Letters Patent No. 87,359, dated March 2, 1869; reissue No. 4,951, dated June 18, 1872; reissue No. 5,471, dated July 1, 1873; reissue No. 7,517, dated February 20, 1877; application filed November 11, 1876.

*To all whom it may concern:*

Be it known that I, HENRY L. PALMER, formerly of Stillwater, Saratoga county, and State of New York, and now of the city of Brooklyn, county of Kings, State of New York, have invented new and useful improvements in machinery for uniting thin paper and straw-board or such like materials by means of paste; and I hereby declare that the following is a full, clear, and exact description and specification of the same, reference being had to the annexed drawings.

Previous to my present invention straw-board had been lined with thin paper by machinery which applied the paste to the thin paper, united the same with the straw-board, and then dried the united layers by means of a drying-cylinder; also, paste had been applied to paper by passing it between two rolls, by which the paste was partially dried, freed from lumps, and spread on the paper in an even and uniform film.

The object of my invention was to combine this latter class of pasting apparatus with a pressing or uniting roll, in connection with a drying-cylinder, for the purpose of lining straw-board with thin lining-paper; and to this end my invention consisted in combining a paste-reservoir, a paste and distributing roll, a feeding-press roll, for pressing, pasting, and feeding the thin lining-paper, with a roll for pressing and uniting the straw-board to the thin lining-paper as they pass to the drying-cylinder, the feeding-press roll being driven by the motive power at substantially the same circumferential speed as the circumferential speed of the pressing or uniting roll and drying-cylinder, or the speed of the straw-board. By the said combination I was enabled to press the paste on the thin lining-paper between the paste-distributing roll and the feeding-press roll, so as to feed the thin lining-paper forward without the assistance of the straw-board, and prevent the straining or breaking of the thin wet lining-paper, which is not able to stand the strain of revolving the paste-applying rolls when pulled by the straw-board at the line of union between the two.

I am not aware that the above result was ever accomplished before my present invention, and it is an important one to insure the successful lining of straw-board with thin lining-paper by machinery.

For the purpose of economically and profitably lining straw-board the lining-paper should be as light in weight as possible.

In order that persons skilled in the art may understand, make, and use said improvements, I will proceed to describe the mechanism as it was constructed, referring to the annexed drawings, in which—

Figure 1 represents a vertical longitudinal section of the machine; and Fig. 2 represents an end elevation, partly in section.

A is a paste-reservoir. B is a paste-roll, arranged to revolve in said reservoir. C is a distributing-roll, arranged to revolve with the paste-roll B, and separated from said roll by a film of paste. D is a feeding press roll, for pressing, pasting, and feeding the thin lining-paper. It is caused to revolve on its axis by the motive power of the machine by means of a belt, its circumference moving at substantially the same speed as the pressing or uniting roll L, or the drying-cylinder H, and in connection with the distributing-roll C, between which and the roll C the paper passes to receive the paste from roll C, and by the resistance of which the paste is forced against the paper, and the paper is fed forward. L is a self-adjustable pressing-roll, under the roll D, between the upper surface of which and the lower surface of the roll D the two layers of paper and a continuous belt of felt, P, pass, and by the pressure of which the two layers of paper are united. The adjusting-springs are seen at M. G G′ are also pressing-rollers, between which the felt and the two layers of paper are caused to pass. H is a drying cylinder or roll, into which steam or heated air is introduced for the purpose of drying the two layers of paper as they pass under its surface, being pressed against it by pressing-rolls Z Z′. I I′ are calender-rolls, and K K′ are revolving knives for cutting the united and dried paper into sheets.

The roll of thin paper to be supplied with paste is hung on the roll E, which has bearings in the sides of the frame.

The rollers B and D were made concave, and the rollers C and L convex; but I do not confine myself to the use of concave and convex rolls, as cylindrical rolls may be used in their places.

To revolve the rolls I have applied pulleys on the end of the shafts, to which the rolls D and H and K are attached, and have connected them by means of belts, the other rolls being revolved by frictional contact with the fet, or paper, or the adjacent rolls.

The operation is as follows: Paste is supplied to the reservoir A in such quantity and consistency that it will be taken up by the roll B as it revolves, and be carried between the rollers B and C, where it is pressed and deposited on the surface of the roll C in a uniform film. It is then carried on the surface of the roll C to the paper, which is passing between rolls D and C, from a roll hung on the shaft E, and deposited on it by the pressure of the roll C against the paper, resisted by the roll D. The pasteboard is fed in a continuous ribbon, or in sheets, and carried forward by the felt P to the under side of the roller D, where it meets the paper. The two materials are then passed through with the felt between rollers D and L, the spring M accommodating for any difference there may be in the thickness of the pasteboard or paper. The object of the concave and convex rollers is seen at this point by giving a rounding or convex form to the surface to which the paper is applied to compensate for any contraction of the wet paper. The material then passes forward in the direction indicated by the arrows between rollers G G′, where it receives additional pressure around the drying-cylinder H, where it is dried; thence through the calenders I I′, where it is smoothed and straightened; thence between knives K K′, which will sever the sheets, or cut to any desired size.

If it be desired to paste the board instead of the paper, it will be done by changing the direction of the paper, and, as in this figure, bring it directly from E to G G′, as indicated by the dotted lines. The pasteboard coming from between rollers D and L, where it has been pasted, meets the paper between G G′, after which it will proceed as in Fig. 1.

I do not claim the drying-cylinder H, calenders I I′, or the knives K K′; but I claim them only in combination with the other parts specified.

Having now described the said improvements, what I claim, and desire to secure by Letters Patent, is—

1. The combination, in a straw-board lining-machine, of a paste-reservoir, a paste-roll, a distributing-roll, and a feeding-press roll, for feeding, pasting, and pressing the thin lining-paper, with a roll for bringing the straw-board in contact with the lining-paper and uniting them, all constructed and operating substantially in the manner and for the purposes set forth.

2. The combination, in a straw-board lining-machine, of a paste-reservoir, a paste-roll, a distributing-roll, and a feeding-press roll, for feeding, pasting, and pressing the thin lining-paper, with a roll for bringing the straw-board in contact with the lining-paper and uniting them, and a drying-cylinder, all constructed and operating substantially in the manner and for the purposes set forth.

HENRY L. PALMER.

Witnesses:

PHILLIPS ABBOTT,
M. FITZGIBBONS.